(12) United States Patent
Tsuruta et al.

(10) Patent No.: US 6,616,557 B2
(45) Date of Patent: Sep. 9, 2003

(54) CLIP FOR BLADE TENSIONER AND BLADE TENSIONER WITH CLIP

(75) Inventors: Shinji Tsuruta, Ueno (JP); Hiroyoshi Mitsuhashi, Nara (JP)

(73) Assignee: Borgwarner, INC, Auburn Hills, MI (US)

( * ) Notice: Subject to any disclaimer, the term of this patent is extended or adjusted under 35 U.S.C. 154(b) by 0 days.

(21) Appl. No.: 10/044,329

(22) Filed: Jan. 10, 2002

(65) Prior Publication Data

US 2002/0107096 A1 Aug. 8, 2002

(30) Foreign Application Priority Data

Feb. 2, 2001 (JP) .......................................... 2001-26666

(51) Int. Cl.[7] .............................. F16H 7/08; F16H 7/18
(52) U.S. Cl. ...................................... 474/111; 474/140
(58) Field of Search ................................ 474/111, 140; 267/66, 52, 44, 160, 245, 229, 53, 158

(56) References Cited

U.S. PATENT DOCUMENTS 3,749,389 A * 7/1973 Duchemin .................. 267/52
4,282,945 A * 8/1981 Bessey ........................ 267/66
5,016,861 A * 5/1991 Thompson et al. ........... 267/44
5,425,680 A * 6/1995 Young ........................ 474/111
6,322,470 B1 * 11/2001 Markley et al. ............. 474/111

FOREIGN PATENT DOCUMENTS

| EP | 0 278596 A1 | * | 8/1988 |
| JP | 58-37334 A | * | 3/1983 |
| JP | 2000-230611 | | 8/2000 |
| JP | 2000-234656 | | 8/2000 |

* cited by examiner

*Primary Examiner*—Marcus Charles
(74) *Attorney, Agent, or Firm*—Brown & Michaels, PC; Greg Dziegielewski

(57) ABSTRACT

A blade tensioner includes a blade shoe having a chain sliding face and a plurality of blade springs disposed and stacked at the opposite side to the chain sliding face. A clip is provided on the blade springs. The clip includes a clip body encompassing the blade springs, which elastically contacts the blade springs, and an engaging portion integrally formed with the clip body. The engaging portion includes an engagement hole to engage a tool.

12 Claims, 3 Drawing Sheets

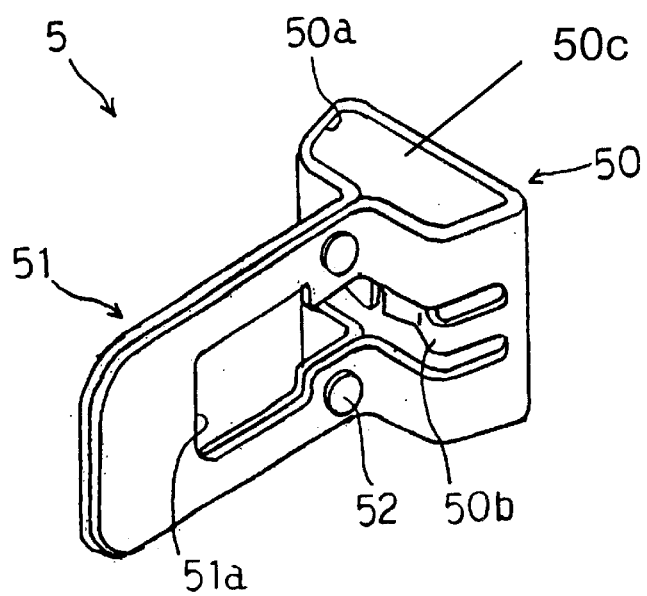
Figure 2
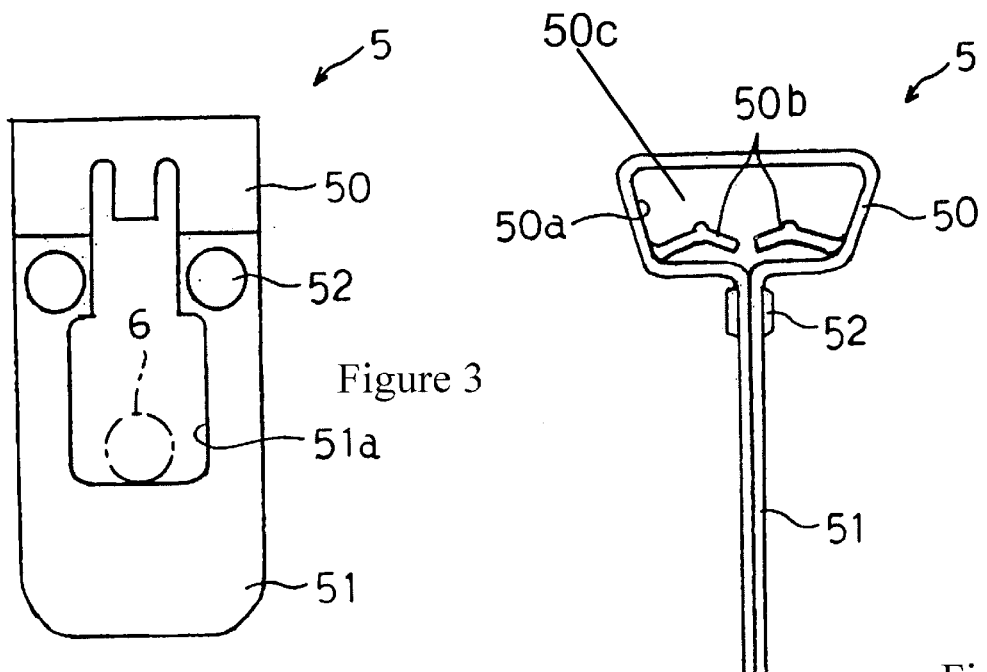
Figure 3
Figure 4

CLIP FOR BLADE TENSIONER AND BLADE TENSIONER WITH CLIP

BACKGROUND OF THE INVENTION

1. Field of the Invention

The invention pertains to the field of blade tensioners. More particularly, the invention pertains to a clip for a blade tensioner.

2. Description of Related Art

Blade tensioners have been used in the past to apply tension to chains. Generally, blade tensioners comprise primarily a blade shoe made of resin having an arcuately curved chain sliding face and numerous leaf spring-shaped blade springs. The blade springs, which act to apply spring force to the blade shoe, are made of metallic material disposed and stacked on the opposite side of the blade shoe from the chain sliding face.

When the chain is operating, the chain slides and runs on the sliding face. The pushing load accompanying the elastic deformation of the blade shoe and the blade springs is applied to the chain, resulting in tension to the chain. If the chain slackens while operating, blade springs will protrude on the chain side due to the blade spring which elastically deforms to the side where the radius of curvature enlarges, returning and deforming to the side where the radius of curvature decreases so that a uniform tension is maintained on the chain.

When a chain enlarges or stretches in the course of operation over a long period of time, there are occasions when it is necessary to replace chains. However, due to the fact that a blade tensioner maintains pressure on a chain, replacing a chain is not easy to do under these circumstances since tension is constantly applied to the chain.

Particularly, when blade tensioners are used on engine timing chains, the gaps between links are longer on engine timing chains than on auxiliary drive chains and the elastic rebound force of the blade springs is great. Considerable force is necessary to move a blade tensioner contacting an engine timing chain to a position where it separates from the chain, making the replacement of the chain particularly difficult.

The present invention was devised in light of these problems with the prior art to make it easier to replace chains.

SUMMARY OF THE INVENTION

A blade tensioner includes a blade shoe having a chain sliding face and a plurality of blade springs disposed and stacked at the opposite side to the chain sliding face. A clip is provided on the blade springs. The clip includes a clip body encompassing the blade springs, which elastically contacts the blade springs, and an engaging portion integrally formed with the clip body. The engaging portion includes an engagement hole to engage a tool.

BRIEF DESCRIPTION OF THE DRAWINGS

FIG. 2 shows an oblique view of the clip of the present invention.

FIG. 3 shows a front view of the clip of the present invention.

FIG. 4 shows a side view of the clip of the present invention.

DETAILED DESCRIPTION OF THE INVENTION

Figure 1:
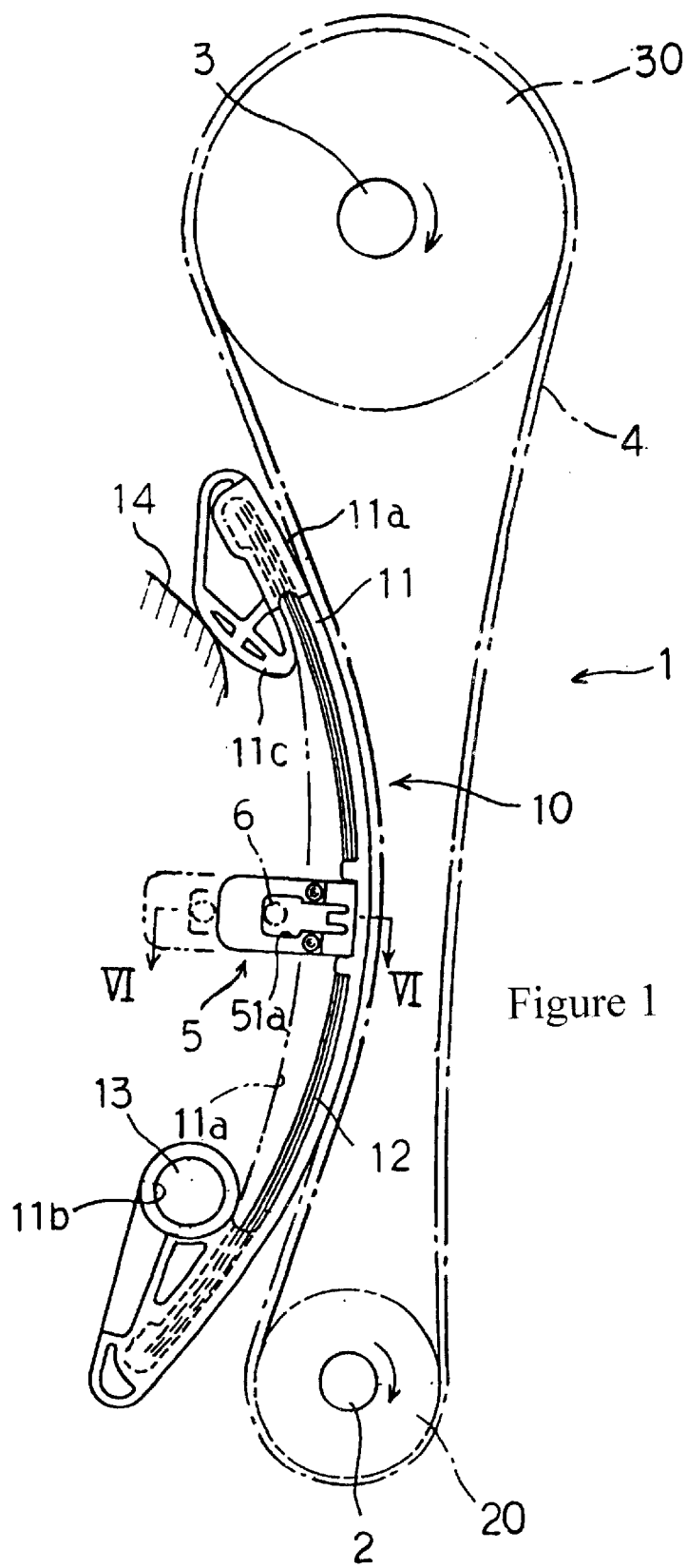
FIG. 1 shows a simplified schematic drawing of an engine camshaft timing system containing a blade tensioner with a clip for a blade spring in an embodiment of the invention.

The present invention is a clip for a blade spring mounted on a leaf spring-shaped blade spring and a blade tensioner outfitted with this clip.

The clip is preferably mounted on a blade spring in a blade tensioner which applies tension to a chain. The blade tensioner includes an arcuately curved blade shoe having a chain sliding face and leaf spring-shaped blade springs on the opposite side of the blade shoe from the chain sliding face. The blade springs apply spring force to the blade shoe. The blade springs have an inner periphery, which is the concave side of the blade springs, and an outer periphery, which is the convex side of the blade springs. The clip includes a clip body mounted to the blade spring and an engaging portion for engaging a tool. The engaging portion is preferably perpendicular to the clip body so that it extends from the inner periphery of the blade spring. When the clip is mounted to a blade spring while the chain is operating, the repelling force due to the elastic deformation of the blade shoe and the blade spring apply a pushing load on the chain and impart a uniform tension to the chain.

To replace the chain, a common tool, for example a screwdriver, is engaged in the engaging hole of the engaging portion of the clip. Using the tool, following the blade spring, the entire blade tensioner is moved to the side, separating it from the chain. Then a portion of the tool is secured in an indented portion, for example a bolt hole, in the engine or to a protruding portion, for example a rib, and secured. The chain sliding face of the blade shoe is maintained in this position separate from the chain. Consequently, the tension acting upon the chain is relaxed and the chain can be replaced with ease. In addition, a special tool for moving the blade tensioner to a position separate from the chain is not necessary. Since a commonly used tool such as a screwdriver will suffice, the present invention has the advantage that replacement of a chain becomes possible anywhere.

Similar to when replacing a chain, initially installing a chain can also be done easily without using a special tool. Briefly, a tool is engaged in the engaging hole of the clip and the entire blade tensioner is moved to the initial position which is a position separated from the chain using the tool.

In a preferred embodiment, the clip has an insertion hole in which the blade spring is inserted as well as a frame portion which encloses the surroundings of the blade spring. The frame portion includes an elastic piece which elastically contacts the blade spring. The clip is prevented from moving out of position or from moving freely and causing chattering while the chain is running because the clip is elastically held to the blade spring. The frame portion of the clip in which the blade shoe is inserted elastically contacts the blade spring via the elastic piece.

The strip shaped piece is preferably formed by cutting out a portion of the frame portion. The cutting out process is preferably performed at the same time as the engaging hole for the tool is formed. The elastic piece is preferably formed by bending the strip shaped piece. In a preferred embodiment, the clip is manufactured by press punching band steel and bending. The clip structure and the manufacturing process are simplified in all of these cases.

The chain is preferably a timing chain for driving an overhead camshaft of an engine. That is because gaps between links are longer on timing chains than on auxiliary drive chains and the elastic rebound force of the blade springs is great. When replacing a chain, considerable force is necessary to move a blade tensioner contacting a chain to a position where it separates from the chain.

In another embodiment, a blade tensioner is preferably outfitted with any of the clip embodiments discussed herein. As has been explained, some of the advantages of the present invention include the fact that chains can be easily replaced and the clip does not get out of position during operation. In addition, the structure of the clip is simplified and it is easy to manufacture.

Figure 5:
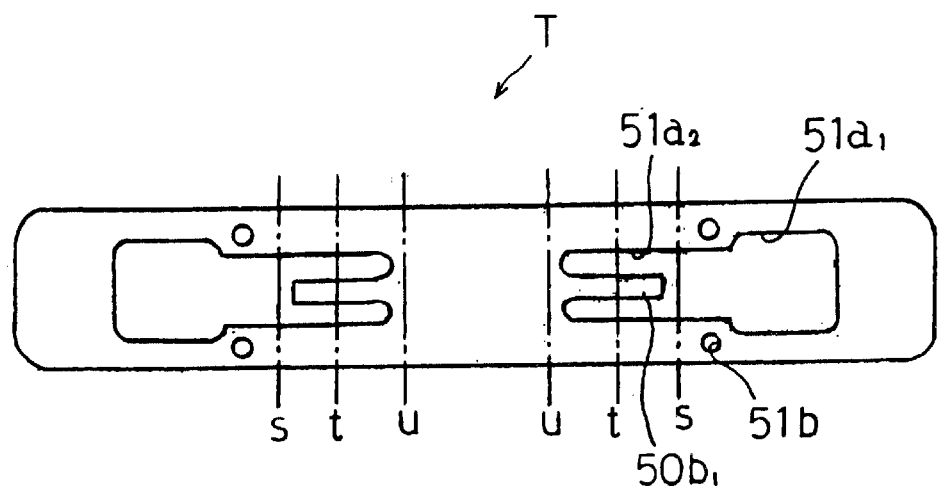
FIG. 5 shows an expanded view of the clip of the present invention.
Figure 6:
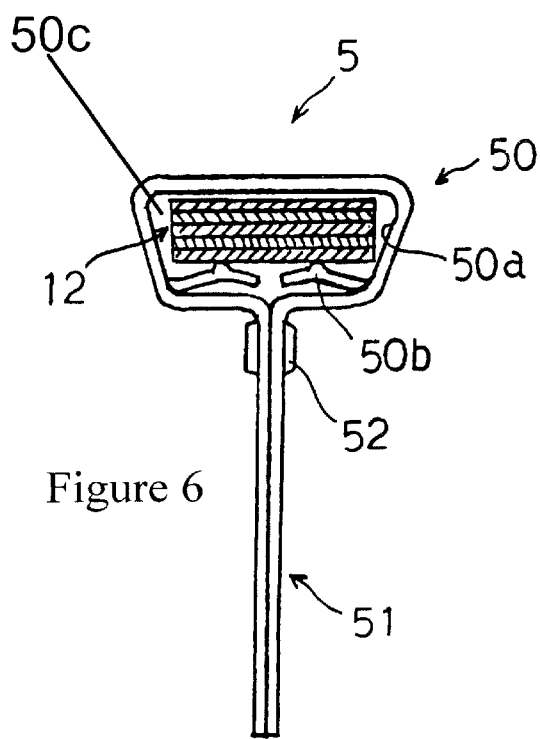
FIG. 6 shows a cross sectional drawing of line VI—VI of FIG. 1.

A preferred embodiment of the invention is discussed below based on the accompanying drawings. FIG. 1 is a simplified schematic drawing of an engine camshaft timing system containing a blade tensioner with a clip for a blade spring in an embodiment of this invention. FIG. 2 is an oblique view of the clip. FIG. 3 is a front view of the clip. FIG. 4 is a side view of the clip. FIG. 5 is an expanded view of the clip and FIG. 6 is a cross sectional drawing of line VI—VI of FIG. 1.

As shown in FIG. 1, a camshaft timing system 1 is outfitted with a crank sprocket 20 secured to crankshaft 2, a cam sprocket 30 secured to camshaft 3 and a timing chain 4 which is wrapped around and hung on the sprockets 20 and 30.

Blade tensioner 10 is disposed on the slack side of timing chain 4. The blade tensioner 10 is configured from an arcuately curved blade shoe 11 made of resin and one or more leaf spring-shaped blade springs for applying spring force to blade shoe 11. The blade springs 12 are disposed on the opposite side of blade shoe 11 from chain sliding face 11a. A clip 5 is mounted in the center of the blade tensioner 10 in the longitudinal direction of blade spring 12.

Blade shoe 11 is supported so that it may rotate in either direction by a bolt or pin 13 which passes through hole 11b formed on its proximal end. The distal end 11c of blade shoe 11 contacts support face 14a provided in the engine so that it may slide on this support face 14a.

While a single overhead camshaft (SOHC) type engine was used as the example in FIG. 1, the blade tensioner of this invention may be applied in the same way to a double overhead camshaft type engine (DOHC). Likewise, it may be applied in the same way to an auxiliary drive chain for driving auxiliary devices such as engine oil pumps which have been used in the past, as well as for timing chains. Furthermore, the clip of this invention is not restricted to engines like that shown in FIG. 1; it may be applied to other blade tensioners so long as blade springs are disposed on the side opposite of the blade shoe from the chain sliding face.

As shown in FIGS. 2 through 4, clip 5 preferably has an insertion hole 50c in which blade spring 12 is inserted, which is configured from frame shaped clip body 50. Clip body 50 is mounted to blade spring 12. Clip 5 also has an engaging portion 51 which has engaging hole 51a for engaging a tool such as a screwdriver. Engaging portion 51 is provided as a unit with clip body 50 and extends in a direction which is nearly perpendicular to the direction the blade spring is placed.

Clip 5 is preferably made by the following method.

Clip 5 is preferably made from band steel T like that shown in FIG. 5. In band steel T, nearly rectangular shaped hole $51a_1$ and fork shaped cut-out $51a_2$ linked to this are preferably press punched out and formed at the same time. Strip shaped piece $50b_1$ which configures elastic piece $50b$, is formed by forming cut-out $51a_2$. Likewise, rivet hole $51b$ for inserting a rivet which is explained later is similarly punch pressed out and formed. Hole $51a$, cut-out $51a_2$, and rivet hole $51b$ are formed symmetrically right and left on both sides of band steel T.

Next, band steel T is formed into a three-dimensional configuration like that shown in FIG. 2 by bending it following the respective curved lines s, t and u of FIG. 5. At this time, strip shaped piece $50b_1$ is bent as shown in FIG. 4 to configure elastic piece $50b$. Clip 5 is completed after rivet 52 is inserted in each opposite facing rivet hole $51b$ and the rivet heads are caulked.

As FIG. 6, which is a cross sectional drawing of line VI—VI of FIG. 1, shows, when clip 5 is mounted to blade tensioner 10 (see FIG. 1), blade spring 12 is inserted in the insertion hole 50c of clip body 50 of clip 5. Clip body 50 encloses blade spring 12 and elastic piece 50b elastically contacts the lower face of the lowest layer of blade spring 12. Clip 5 is elastically held to blade spring 12 by the elastic piece 50b. While chain 4 is operating, clip 5 is mounted to blade spring 12 and the repulsion force due to the elastic deformation of blade shoe 11 and blade spring 12 acts as a pushing load on chain 4 and applies a uniform tension on chain 4.

When replacing chain 4, a widely used tool 6, for example a screwdriver, is inserted in engaging hole 51a of engaging portion 51 of clip 5 (see the single dotted chain line in FIG. 1 and FIG. 3) and engaged. Using tool 6, following blade spring 12, the entire blade tensioner 10 is moved to a side separated from chain 4 (see the double dotted chain line in FIG. 1). Then the tip of tool 6 is engaged in an indented portion, such as a bolt hole, in the engine or to a protruding portion, such as a rib, and secured. The chain sliding face 11a of blade shoe 11 is placed in a position away from chain 4 and secured.

By doing this, the tension acting upon chain 4 is relaxed and therefore chain 4 can be replaced with ease. In addition, no special tool for moving blade tensioner 10 to a position separate from chain 4 is needed. Since a commonly used tool such as a screwdriver will suffice, the present invention has the advantage that replacement of a chain becomes possible anywhere.

When assembling an engine, it is easy to initially install chain 4 to the engine without using a special tool. Tool 6 is inserted and engaged in engaging hole 51a of clip 5 and tool 6 moves the blade tensioner 10 from this state to the initial position which is a position separated from chain 4. Likewise, because it is held elastically to blade spring 12 with elastic strip 50b, clip 5 does not get out of position or cause chattering during operation.

Further, in this case as previously explained, elastic strip 50b of clip 5 is formed by bending and shaping strip shaped piece $50b_1$ which is formed by press punching band steel. Due to this, the structure of clip 5 is simplified. Likewise, the press punching which forms strip shaped piece $50b_1$ is preferably done at the same time as the press punching which forms engaging hole 51a. This simplifies the manufacturing process. In addition, since clip 5 is made by press punching band steel and bending, the structure and manufacturing of clip 5 is simplified. Also, the present invention makes it easier to replace a chain because a clip having an engaging hole for engaging a tool is mounted to blade springs of a blade tensioner.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A clip in combination with a blade spring on a blade tensioner for applying tension to a chain, the tensioner comprising an arcuately shaped blade shoe with a chain sliding face and a blade spring for applying a spring force to said blade shoe, said blade spring being in the shape of a leaf spring and disposed at the opposite side to said chain sliding face of said blade shoe, the clip comprising:
   a) a clip body mounted to said blade spring; and
   b) an engaging portion extending from said clip body and from an inner periphery of said blade spring, said engaging portion having an engagement hole for engaging a tool.

2. The clip of claim 1, wherein said clip body has an opening for inserting said blade spring; and further comprises a frame portion encompassing a perimeter of said blade spring, said frame portion including an elastic piece that elastically contacts with said blade spring.

3. The clip of claim 2, wherein said elastic piece is formed by bending a band piece that is formed by cutting out a portion of said frame portion.

4. The clip of claim 3, wherein a process of cutting out a portion of said frame portion is conducted simultaneously with a process of piercing said engagement hole.

5. The clip of claim 1, wherein said clip is formed by blanking and bending a band steel.

6. The clip of claim 1, wherein said chain is a timing chain to drive an over-head cam shaft of an engine.

7. A blade tensioner for applying tension to a chain comprising:
   a) an arcuately curved blade shoe including:
      i) a chain sliding face; and
      ii) a blade spring disposed on an opposite side of said blade shoe from said chain sliding face for applying spring force to said blade shoe, wherein said blade spring is in a shape of a leaf spring; and
   b) a clip comprising:
      i) a clip body mounted to said blade spring; and
      ii) an engaging portion perpendicular to said clip body such that it extends from an inner periphery of said blade spring, wherein said engaging portion engages a tool.

8. The blade tensioner of claim 7, wherein said clip body has an opening for inserting said blade spring; and further comprises a frame portion encompassing a perimeter of said blade spring, said frame portion including an elastic piece that elastically contacts with said blade spring.

9. The blade tensioner of claim 8, wherein said elastic piece is formed by bending a band piece that is formed by cutting out a portion of said frame portion.

10. The blade tensioner of claim 9, wherein a process of cutting out a portion of said frame portion is conducted simultaneously with a process of piercing said engagement hole.

11. The blade tensioner of claim 7, wherein said clip is formed by blanking and bending a band steel.

12. The blade tensioner of claim 7, wherein said chain is a timing chain to drive an over-head cam shaft of an engine.

* * * * *